Feb. 18, 1930.  J. G. YONKESE  1,747,565
EMPENNAGE STRUCTURE FOR AIRCRAFT
Original Filed May 14, 1925   7 Sheets-Sheet 4

WITNESSES

INVENTOR

Feb. 18, 1930.  J. G. YONKESE  1,747,565
EMPENNAGE STRUCTURE FOR AIRCRAFT
Original Filed May 14, 1925   7 Sheets-Sheet 5

WITNESSES

INVENTOR

Feb. 18, 1930. J. G. YONKESE 1,747,565
EMPENNAGE STRUCTURE FOR AIRCRAFT
Original Filed May 14, 1925   7 Sheets-Sheet 6

WITNESSES
INVENTOR

Patented Feb. 18, 1930

1,747,565

UNITED STATES PATENT OFFICE

JOSEPH G. YONKESE, OF BROOKLYN, NEW YORK

EMPENNAGE STRUCTURE FOR AIRCRAFT

Original application filed May 14, 1925, Serial No. 30,135. Divided and this application filed May 31, 1927. Serial No. 195,439½.

This application is a division of my pending application, control mechanism for aeroplanes, Serial No. 30,135, filed May 14, 1925. The present application relates primarily to the empennage structure for aircraft. It is particularly proposed in the present invention to provide an improved empennage of novel construction and arrangement which is adapted to be used on aircrafts having a single or plurality of bodies. It should be kept in mind that my whole invention has particular reference to the empennage used in the larger type of aircraft and the means whereby this empennage is made suitable for guiding the aircraft when alighting or arising from the ground or water.

The aircraft referred to contains a plurality of controlling elements which include manually operated systems, assisting power operated systems, and automatically operated systems. In order to accomplish the best results of the controls, it is necessary that all the control wires or cables extending from the empennage to the control operating mechanisms at the seat of the pilot shall be arranged in such a manner that a minimum of slack or lost motion is attained, since there is considerable deflection of these control wires or cables, due to their extended length. These cables are connected in a simple manner to the auxiliary movable control surfaces and are run in a straight practical manner to the control mechanisms, at the control operator seat of the pilot.

The present invention embodies a strong supporting base for the numerous pulleys and roller guides which are employed for permitting the wires or cables to be moved freely. The control wires or cables which are operatively connected to the controls and their associated guiding mechanisms are enclosed within the structural members of the empennage in order to protect them from the elements, such as water, eddies, and at the same time reducing the air resistance to a minimum. In this connection, it might be stated that the arrangement of the empennage or tail group which constitutes the present invention was particularly designed for use in connection with my control mechanism for aeroplanes and being so constructed as to cooperate with such a control arrangement associated with an aircraft of such a type.

An important object of the present invention is to provide means for a fortified construction and a rigid stability between the tail ends of the bodies of an aircraft constructed in accordance with the principles of my invention.

Another important object of the present invention is to provide means whereby the tail planes or stabilizers, the rudders, and elevators can be elevated from the tail end of the aircraft body or bodies in order to prevent the stabilizers, rudders and elevators from being damaged by the waves in case the aircraft should be forced to alight in a rough sea.

Another important object of the present invention is to provide means whereby the various control operating mechanisms and their accessories will be enclosed within the structural members of the empennage in such a manner as to present a smooth stream-lined box-tail construction, thus reducing the air resistance to a minimum.

Another important object of the invention is to provide means whereby the empennage or tail group may assist as a part of the lifting surface as well as a part of the balancing surface for the aircraft.

Another important object of the invention is to provide means whereby the frame structures or vertical tail supporting members and the horizontal tail planes or stabilizers are unbroken members in order to preserve strength, and housing containers for enclosing the controlling mechanisms. For this reason, the tail planes or stabilizers are made slotted for receiving their vertical supporting members and oscillating the members when operated.

This invention will be best understood from a consideration of the following detailed description in view of the accompanying drawings forming a part of the specification. Nevertheless, it is to be understood that the invention is not confined to the disclosure, being susceptible of such changes and modifications which shall define no material departure from the salient features of the invention as expressed in the appended claims.

Figure 1:
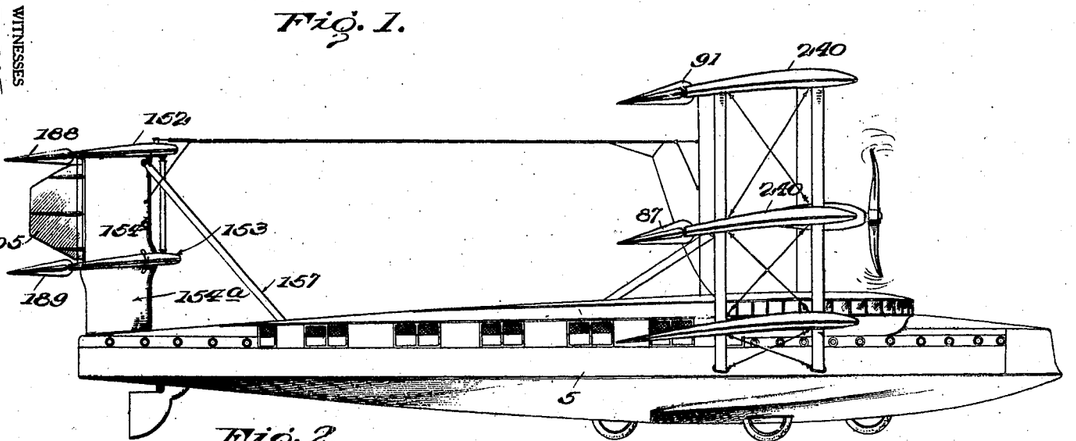
Figure 1 is a longitudinal side view in elevation of an aircraft constructed as disclosed in accordance with the principles of my invention.
Figure 2:
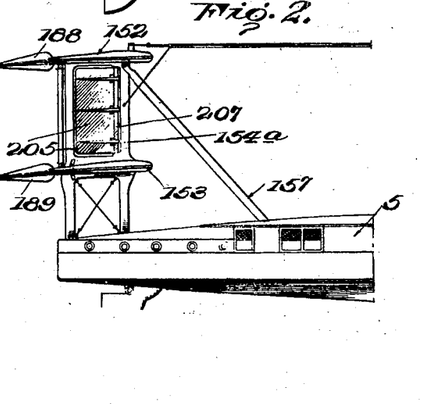
Figure 2 is a fragmentary view in elevation of the body showing a modified form of the empennage of the aircraft.
Figure 3:
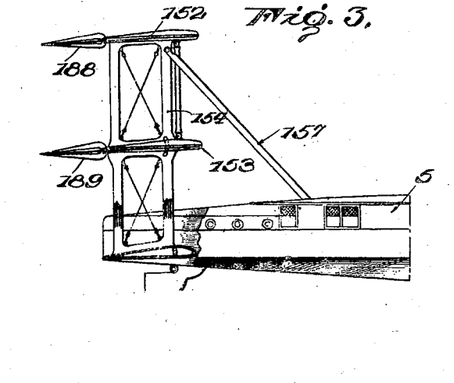
Figure 3 is a fragmentary view similar to Figure 2 taken along section 154$^a$—154$^a$ through the empennage of the aircraft.
Figures 4, 5, 6:
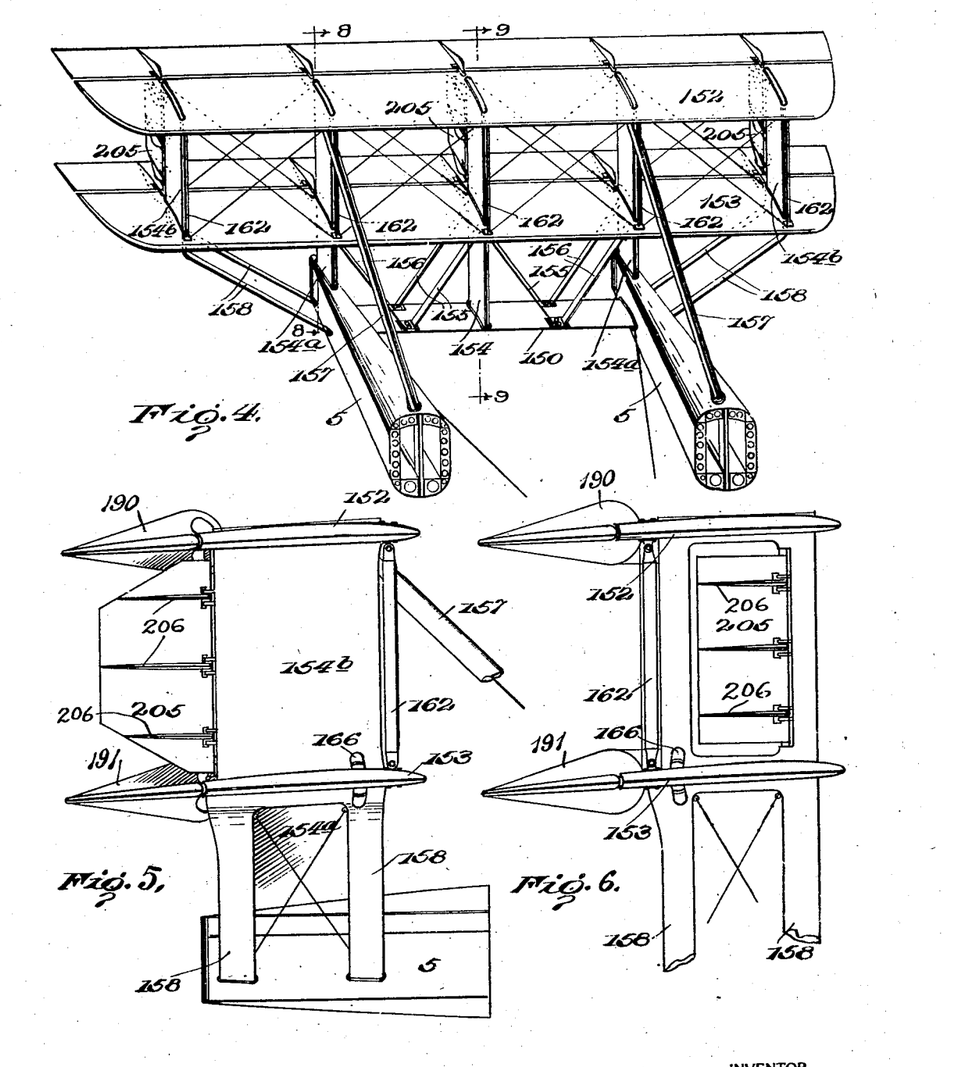
Figure 4 is a view in perspective of the empennage or tail group assembly disclosing the constructional feature arrangements of the same.
Figure 5 is a side view of Figure 4.
Figure 6 is another side view showing a modified form of the same.

To explain the invention, I shall now proceed to the description of the empennage or tail group assembly illustrated in detail in Figures 1 to 19 inclusive. It is assumed for the purpose of illustration that the aircraft has two bodies 5 arranged in parallel relation. The two tail ends of the bodies are rigidly connected by means of transverse brace members 150 and 151 which are firmly anchored to the two bodies. The assembly of the empennage or tail group consists of two tail planes 152 and 153, usually called stabilizers, arranged one above the other. The two tail planes or stabilizers are supported by a plurality of frame structures 154, 154$^a$ and 154$^b$, serving as vertical tail-supporting members. As shown in Figure 4, the member 154 being the center tail-supporting member and extending from the upper tail plane through the slotted lower tail plane is firmly secured to the transverse member 150 and rigidly connected by means of further brace members 155. 154$^a$ are the two tail-supporting members next from the center, i. e., intermediate members and rise from each tail end of the bodies 5 extending from the upper tail plane through the slotted lower tail plane to the bodies. The latter members being firmly secured at the tail end of the bodies between two longitudinal plates which form the main constructional members of the bodies, and they are further rigidly connected by lateral brace members 156, and against longitudinal collapsing by means of brace members 157, usually called booms or outrigger. The latter members being secured to a more forward portion of the tail end of the bodies between the center longitudinal plates of the bodies. 154$^b$ are the two outer tail-supporting members extending between the upper and lower tail planes and from thence they bend toward the bodies forming two pairs of brace members 158 connecting the tail end of the two bodies.

Each of the frame structures consists of metal or wood, formed in a pair of side plates assembled together, consisting preferably of front and rear vertically extended members or struts. The members or struts being arranged in parallel relation and symmetrical to the two struts in the other frame form integrally one piece in the vertical and longitudinal frame.

The three frame structures 154 and 154$^b$—154$^b$ will serve both as vertical tail-supporting members and rudder posts supporting members; and they are provided with such pivotal or supporting means to receive the rudder shafts 207. The frame structures are drawn in two different forms. Figure 5 is drawn in accordance with a preferred form of the invention showing the rudders pivoted behind the rear struts or columns of the frame structures, while Figure 6 is drawn in accordance with a modified form of the invention showing the rudders pivoted behind the front struts of the frame structure extending rearwardly between the front and the rear struts of the frame structures.

The two frame structures 154$^a$ are in the line of symmetry with the aircraft bodies and are secured at the tail end of the bodies. These are the two vertical tail-supporting members within which the control operating mechanism of the empennage is enclosed.

The two horizontal tail planes or stabilizers 152 and 153 are slotted at equal intervals and two different places for receiving their vertical supporting members and the elevator control members. The tail planes or stabilizers consist ordinarily of two transversal members or spars 152$^a$ and 152$^b$, and 153$^a$ and 153$^b$. These members or spars form the front and rear main supporting members for the two tail planes, and are rigidly connected by a plurality of double compression members 153$^c$, by numerous ribs 153$^d$, and by means of internal braces 153$^e$.

The members 153$^c$ extend in a fore and aft direction and symmetrical to the members 152$^a$ and 152$^b$, 153$^a$ and 153$^b$. The former members being so connected to the latter members as to form between their inner faces a slot or recess opening between front and rear transversal members for receiving the vertical supporting members 154, 154$^a$ and 154$^b$, and a slot or recess opening behind the rear transversal members for receiving the upper and lower elevator control members 190 and 191 respectively, all of identical construction and of which five of each are shown (see Fig. 17). The members 153$^c$ are constructed and reinforced for resisting the supporting stresses as follows:

Referring to Figures 7–12 inclusive, it will be seen that adjacent the rear spars 152$^b$ and 153$^b$, the members 153$^c$ carry the supporting base 160 and 160$^a$ for receiving the pivots 161 which connect the tail planes to their vertical supporting members 154, 154$^a$ and 154$^b$. Adjacent the front spar 153$^a$ they carry the supporting base 165$^a$ for receiving a shaft 165 which is employed for raising or lowering the front end of the tail planes. At the rear end, they carry the supporting bases 140 which project further rearwardly from the rear edge of the tail planes for receiving the elevator control shafts 192 and 193.

Between the inner faces of each double member and behind the rear spars of the two tail planes, they form a slot or recess opening 159$^a$ for the oscillation of the elevator control members 190 and 191. The supporting base 140 being made to open for the purpose of facilitating the work of attaching the elevators to the tail planes or stabilizers, and they consist of two half portions as follows: A lower half 140 is fixed solid to the rear portions of the members 153$^c$. The upper half 140$^a$ is detachable, but may be firmly locked to the lower member by means of a link 141, which extends under a lip 142, through a slot 143 provided for receiving the link 141. A bolt 144 is provided for locking the forward end of 140$^a$ to the lower solid portion 140. This may be seen more distinctly in Figure 10 which shows the two portions in detached relation.

The two tail planes or stabilizers are pivoted at their rear ends to their respective tail supporting members 154, 154$^a$ and 154$^b$ inclusive, as shown at 160 and 160$^a$. Their front ends being arranged to be raised and lowered as adjustable tail planes for the purpose of the adjustable balance of the aircraft are interconnected by means of a plurality of spacing members or links 162 so that the upper plane will follow the motions of the lower one. The latter plane is swung on its pivots 161 by means of a plurality of pinions 163 located within the hollow portion of the vertical tail supporting members and engaging with a plurality of stationary toothed racks 164 secured to the inner walls of said supporting members. The racks are arched to correspond to the periphery of a circle of which the pivots 161 are the center. The pinions 163 are supported on a shaft 165 which is mounted for rotation within the front end of the lower stabilizer 153, as shown in Figures 7, and 10–16 inclusive. The pinions are keyed or otherwise secured to the shaft so as to rotate with the same and be operated by the same.

The shaft referred to is passed through the arcuately shaped slots 166 formed in the tail supporting members 154, 154$^a$ and 154$^b$ inclusive, which latter slots are adapted to allow the shaft to ride up and down in them during its operation. The shaft being rotated by sprockets 167 located within the hollow supporting members 154$^a$ keyed or formed integrally with the pinions 163 are adapted to rotate the shaft. The sprockets 167 being operated by means of chain 167$^a$ and the second sprockets 168 rotatably mounted on pivots 161 of stabilizer 163 but located within the rear end hollow portion of the members 154$^a$ and in alignment with the first sprockets. Sprockets 168 are fixed to or formed integrally with a pulley member 169 provided for rotating the latter sprocket, and over which is wound a pair of continuous flexible wires 170 and 170$^a$ secured at their middle portions to the pulley, one end of each wire is looped a couple of times clockwise around the pulley, while the other end is looped a couple of times counter-clockwise around the same pulley, in order to allow the pulley to turn either way to cause the pinions 163 to ride up or down on racks 164.

The two pairs of wires leading from their respective pulleys 169 and each pair forming four ends, are brought downwardly and passed over sheaves or pulley member 171. The two ends of wire 170 of both the right and the left hand side are carried straight forward to drums 172 and 173 located in the pilot's seat in each of the air craft bodies 5 provided for operating the wires. The wires are wound around the drums as follows: The end of wire 170 which is wound clockwise around the pulleys 169 is wound also a couple of times clockwise around the drums and secured thereto, and the end of wire 170 which is wound counter-clockwise around the pulleys 169 is wound also a couple of times counter-clockwise around the drums and secured thereto. The wires referred to are wound clockwise and counter-clockwise around their respective drums and pulleys, in order to allow both the drums and pulleys to rotate at least one or twice in either direction so as to allow the required amount of rotation sufficient to operate shaft 165 without causing the latter wires to come to an end during this control operation.

Wires 170$^a$ are similar to 170, and they are employed for the purpose of connecting the right hand side control to cooperate with the ones on the left hand side, and the left hand side control to cooperate with the ones on the right hand side; so that this control may be operated from either the drum 172 or 173, from either one of the aircraft bodies 5, and whenever one of the drums is operated, will control both pairs of sprockets 168 in order to equalize the strain of the shaft 165 and avoiding the twisting stress of the same. The latter wires are erected as follows: The end of wire 70$^a$ which is wound clockwise on the left pulley 169 is passed over sheaves 174 and over sheaves 175 and connected with the end of wire 70 which is wound clockwise on the right pulley 69 as shown at 176, while the end of wire 170$^a$ which is wound clockwise on the right pulley 169 is passed over sheaves 175 and over sheaves 174 and connected with the end of wire 170 which is wound clockwise on the left pulley 169, as shown at 177. The end of wire 170$^a$ which is wound counter-clockwise on the left pulley 169 is passed over sheave 174 and sheaves 175 and connected with the end of wire 170 which is wound counter-clockwise on the right pulley 169, as shown at 178, while the end of wire 170$^a$ which is wound counter-clockwise on the right pulley 169 is passed over sheaves 175 and over sheaves 174 and connected with the end of wire 170 which is wound counter-clockwise on the left pulley 169 as shown at 179.

Both the drums 172 and 173 are provided with a worm gear 180 and 181 operated by worms 182 and 183 on a crank 184 and 185. The drums are arranged in the pilot control operating seat so that the cranks 184 and 185 can be conveniently reached by the pilot when he desires to regulate the nose or tail heaviness of the aircraft while in the air. Means are provided between the two drums, whereby when either one of them is engaged to operate, the other is released to rotate, and the ones which may be engaged for operation will at the same time be maintained against rotation automatically locked by means of the gearing ratio of the worm engaged with the worm gear, so the angle of the stabilizer may be maintained at the position desired by the pilot.

*Elevators*

Generally the elevator or elevators and their controlling arrangements of an aircraft are equipped with usually called elevator control horns or other associated members for controlling the same. In my arrangement, I provide the elevators 188 and 189 equipped with a series of elevator control pulleys 190 and 191 coaxially mounted on elevator control shaft 192 and 193 keyed or otherwise secured to the shafts, so as to move with the same and be controlled by the same. The pulleys 190 and 191 are fixed or formed integrally with a series of compression brace members 190$^a$ and 191$^a$ formed of metal or wood. The latter members, the pulleys and the shafts are formed rigid with the frame construction of the elevators, so as to be controlled by the shafts.

The compression brace members 190$^a$ and 191$^a$ are substituted for the usual elevator brace wires and control horns, they form as a compression and tension brace both, they are thin streamlined fins outside disposed projecting on the upper and lower surfaces of the elevators, with their forward ends made round to conform with the curvature shape of the pulleys 190 and 191 of which the shafts 192 and 193 are the center pivots, and with their rear ends vanishing to a cone-shape at the trailing edge of the elevators.

A shaft 193 which carries a series of pulleys 191 coaxially mounted thereon and rigidly formed to the shaft and the frame construction of the elevator 189 is the operating shaft for controlling the elevators. The shaft 192 which carries a series of pulleys 190 coaxially mounted thereon and rigidly fixed to the shaft and the frame construction of the elevator 188 is an idling shaft, and is connected with the former shaft, so as to move with the same and be carried by the same whenever the latter is operated, by means of a plurality of continuous flexible bands 194. Each of the bands is passed around each corresponding upper and lower pulley 190 and 191, as disclosed in Figure 17, and secured to the pulleys, as shown at 190$^c$ and 191$^c$ Figure 8. The bands referred to may be divided into two sections and connected together by means of adjustable turnbuckles in order to regulate the correct tension of the same and the alignment of the elevators.

Figures 7, 8, 9:
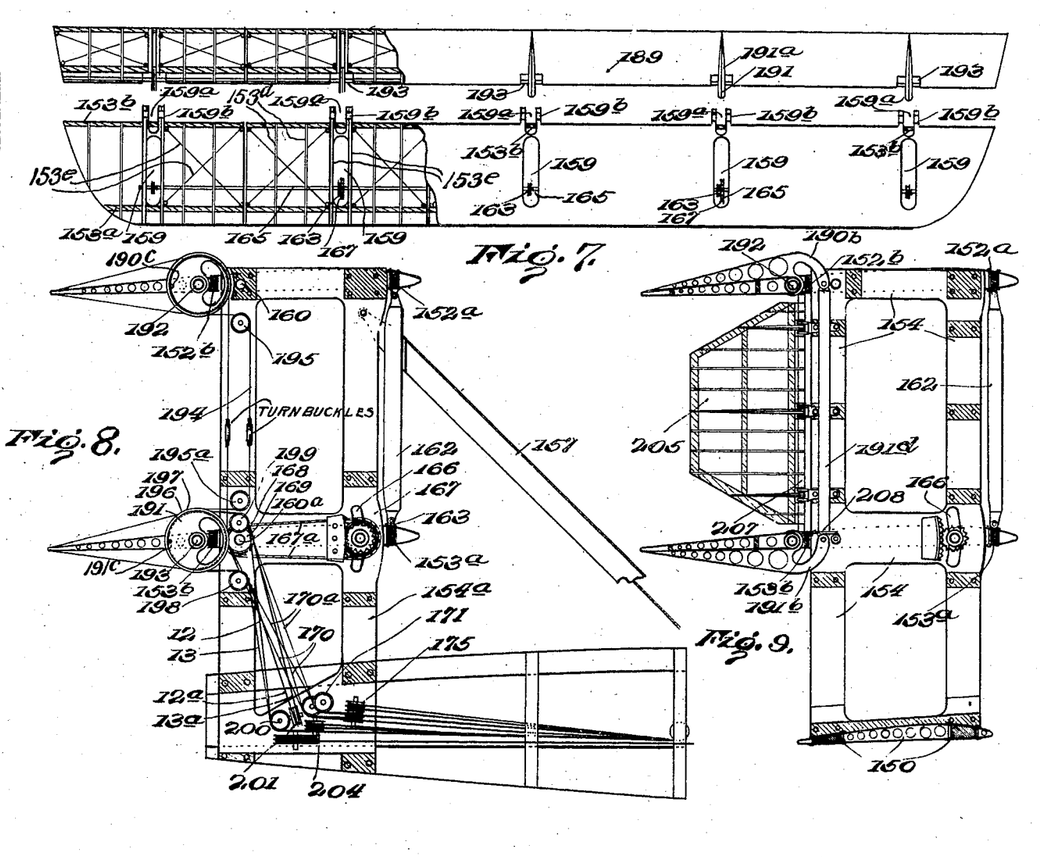
Figure 7 is a detail plan view of the lower tail plane or stabilizer.
Figure 8 is a side view detail of a vertical tail-supporting member taken along the line 8—8 of Figure 4 with the right hand side plate removed disclosing the method of enclosing the controlling operating mechanisms of the various controlling elements within the same.
Figure 9 is a detail side view of another vertical supporting member similar to Fig. 8 taken along the line 9—9 of Fig. 4.

Both the operating shaft 193 and the idling shaft 192 are rackably mounted in bearings 159$^b$ secured to the supporting bases 140 which are provided for that purpose at the rear edge of both upper and lower stabilizers. The elevator control members or pulleys 190 and 191 will ride in the slots 159$^a$, as shown in Figure 7, which illustrates one of the tail planes, or stabilizers, with the elevator in detached relation. The foremost portion of the elevator control members or pulleys 190 and 191 may be made to open in order to facilitate the assembling of the same in their bases, and are provided with a slot for the purpose of oscillating the rear spar beam 152$^b$ and 153$^b$ of the stabilizers during the controlling of the elevators.

Referring to the pulleys 190 and 191 which are employed for controlling the elevators and the brace wires for bracing the trailing edge of the elevators, it will be seen that these can be omitted altogether, and in substitution therefor, cone-shaped compression members may be utilized which will serve to reinforce the structure of the elevators, to brace the trailing edge of the same, and for controlling the same. At the different stations through the empennage where the rudders are attached to the rear edge of the vertical tail-supporting members, the compression members referred to may project outside on the upper surface of the upper elevator, and the under surface of the lower elevator only. At the under surface of the upper elevator and the upper surface of the lower elevator, the compression members may be mutilated in order to clear the way for the rudders right and left swinging as shown in Figure 9. The foremost portion or horns 190$^b$ and 191$^b$ of the upper and lower members may be connected so as to move both in unison, by means of an extension 191$^d$ which is enclosed within the rear housing portion of the vertical tail-supporting members.

Figures 17, 18:
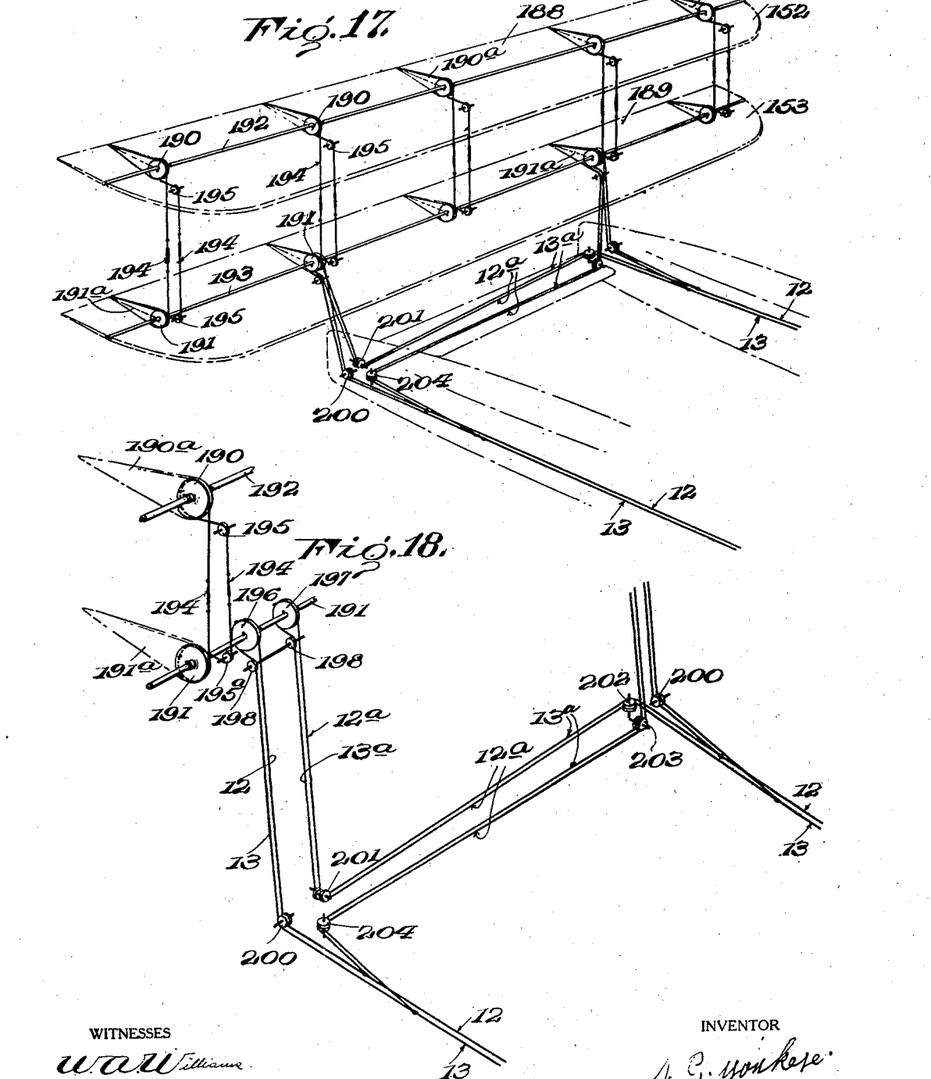
Figure 17 is a view in perspective disclosing the elevator control arrangement at the empennage.
Figure 18 is a view in perspective showing more or less diagrammatically the disposition of the arrangement for controlling the elevators.

Referring to Figure 18 which is a view in perspective showing more or less diagrammatically the disposition of the connections and relation of the control wires or cables for controlling the elevators at the empennage, it will be seen that this structure is located within the housing container of the vertical tail-supporting members 154$^a$—154$^a$ which are in the line of symmetry with the aircraft bodies 5. It will be seen therefore, that the elevator control operating shaft 193 has a plurality of grooved pulleys 196 and 197 which are rigidly secured to the shaft or formed integral with pulleys 191 which are also secured to the same shaft. The pulleys 196 and 197 are adapted to receive the main elevator control cables 12 and 13, and 12$^a$ and 13$^a$.

Cables 12 and 13 and 12$^a$ and 13$^a$ are continuous bands which may be divided in sections connected together by means of adjustable turnbuckles for regulating their correct tension, and they are secured at their center pulling point to pulleys 196 and 197, at the empennage, and to the rear pulley 7 of the general control operating means at the pilot's seat. The cables designated as 12 and 13 leading from pulley 196, the end 13 is passed over sheave 198 and the end 12 is passed over sheave 199, then both the ends 12 and 13 are brought downwardly and passed under sheaves 200, and from thence brought through the aircraft body or bodies 5 and fastened to pulley 7 as previously stated. The cables designated as 12$^a$ and 13$^a$ leading from pulley 197 are similar to the former cables except that the two ends of the right hand side are brought downwardly under sheaves 201, then toward the left over sheaves 202 and connecting the end 12$^a$ wit" the 12 and the 13$^a$ with the 13 of the left hand side. Likewise, the 12$^a$ and 13$^a$, the left hand side are passed under sheaves 203, over sheaves 204 and connected with the 12 and 13 of the right hand side.

Both the 12$^a$ and 13$^a$ are so connected with 12 nd 13 that a pull exercised on either of main cables 12 will cause both the right and left operating pulleys 191 to move clockwise and through the medium of the connection of bands 194 will cause both the upper and lower elevators to incline upwardly, while a pull exercised on either main cable 13 will cause both the operating pulleys 191 to move counter-clockwise and lowering the elevators downwardly. The air craft may be steered in a vertical plane from either one of bodies 5, and at the same time equalizing the strain on the operating shaft 193 and avoiding the twisting stresses of the same.

Figure 19:
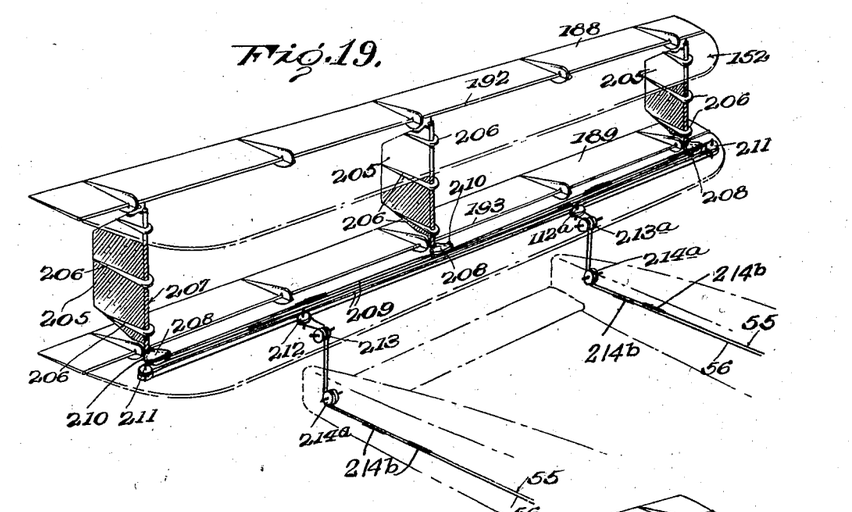
Figure 19 is a view in perspective disclosing the rudder control arrangement at the empennage.

Referring to the tail planes or stabilizers, it should be understood that the same are not necessarily pivoted in the rear struts or columns of the tail supporting members, but may also be pivoted in the front struts of the same, in which latter case the rear end of the stabilizers may swing about the front pivots by means of an arrangement similar to that of pinions 163 and racks 164 arranged in the opposite way. The latter arrangement would be required in the case where the rudders are pivoted as shown in Figure 19. In such case, the spacing members or links 162 may be formed at the rear ends of the stabilizers as shown in Figure 6 instead of being at the front end.

Rudders

The rudders 205 consist of a frame construction having a series of compression brace members 206 similar in construction to that of the ailerons and that of the elevators. The members referred to are substituted for the usual rudder control horns and rudder brace wires, and they serve as a horn and brace wires both. The latter members are formed rigid with the frame construction of the rudders projecting equally on either side of the same in a flat horizontal position. They form a thin streamlined fin with their forward ends conforming to the curvature of a pulley shape and with their rear ends vanishing to a cone shape at the trailing edge of the rudders. Both the rudders 205 and the members 206, being formed rigid to the rudder shafts 207 so as to move with the latter and be operated by the same in the case of the rudders no pulleys are required in the forward ends of the members 206, unless otherwise desired.

Figure 10:
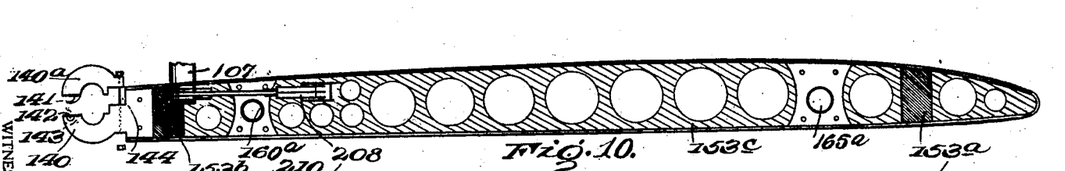
Figure 10 is a detail side view of one of the fore and aft compression members or ribs, showing the method of connecting the elevators at the rear edge of the stabilizers and disclosing the rudder control arrangement.
Figures 11, 12:
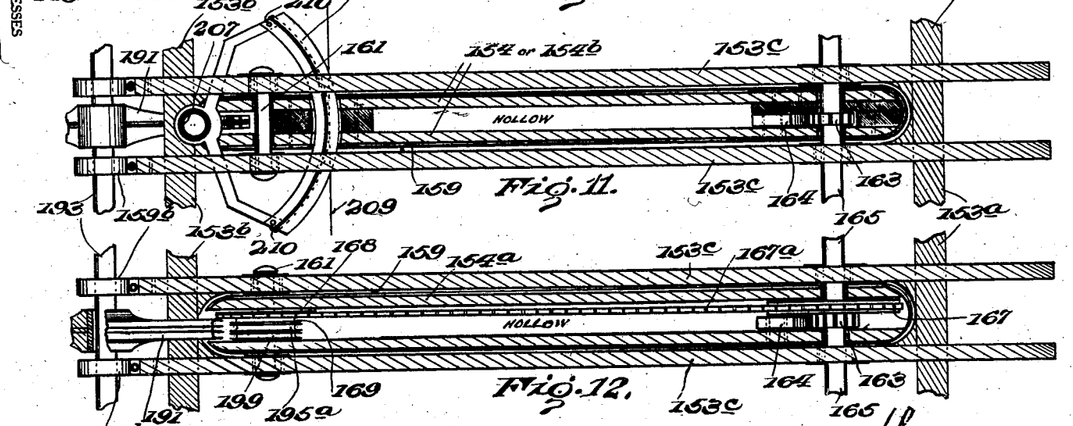
Figure 11 is a fragmentary plan view of Figure 10 showing a pair of compression members spaced in parallel relation and showing the slotted arrangement in the stabilizers and further disclosing the rudder controlling mechanism.
Figure 12 is another fragmentary plan view similar to Figure 11 and disclosing the mechanism for controlling the elevators and the stabilizers adjustable balance.
Figure 13:
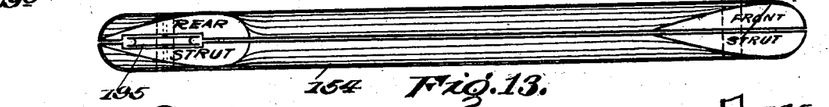
Figure 13 is a detail plan view showing a portion of a vertical tail-supporting member at the lower stabilizer in the form of two side plates fastened together and with the fore and aft vertically extended portions cut off.
Figure 14:
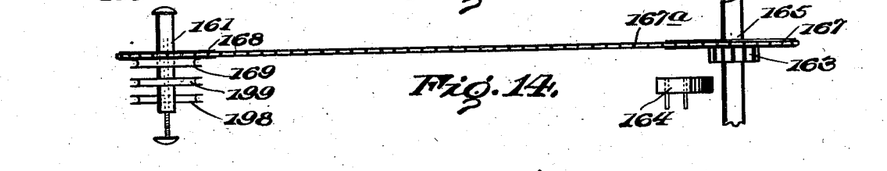
Figure 14 is a detail view showing more or less the disposition of the mechanism as disclosed in Figure 12 which is housed within the structure shown in Figure 13, and which both Figures 13 and 14 form a part of Figure 12.
Figure 15:
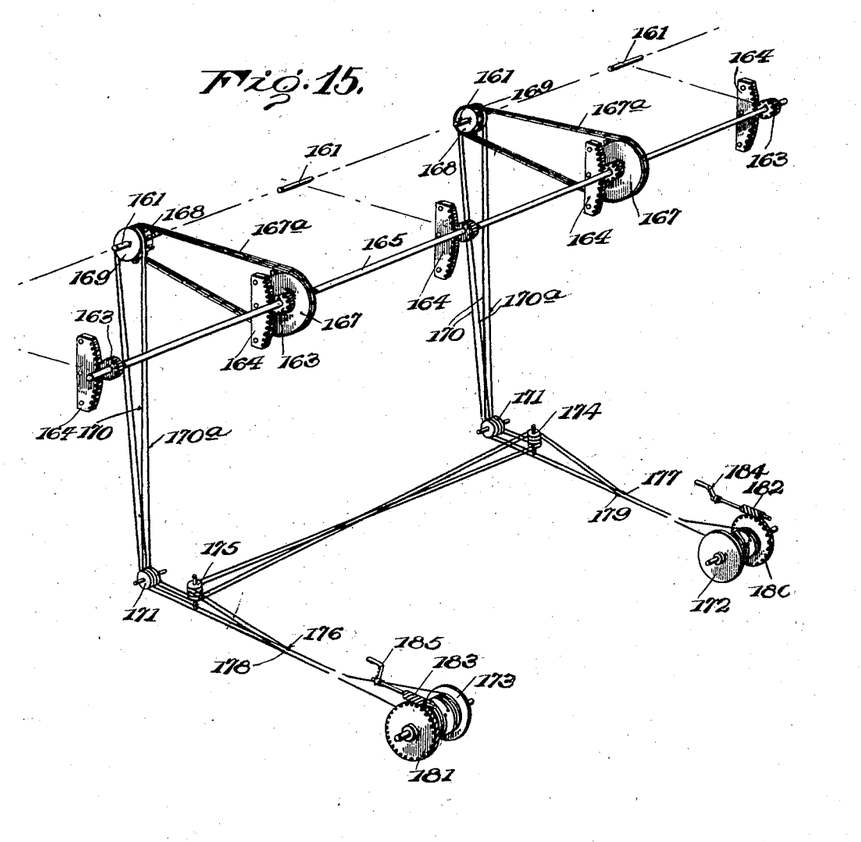
Figure 15 is a view in perspective disclosing the arrangement of the adjustable stabilizer-controlling mechanism.
Figure 16:
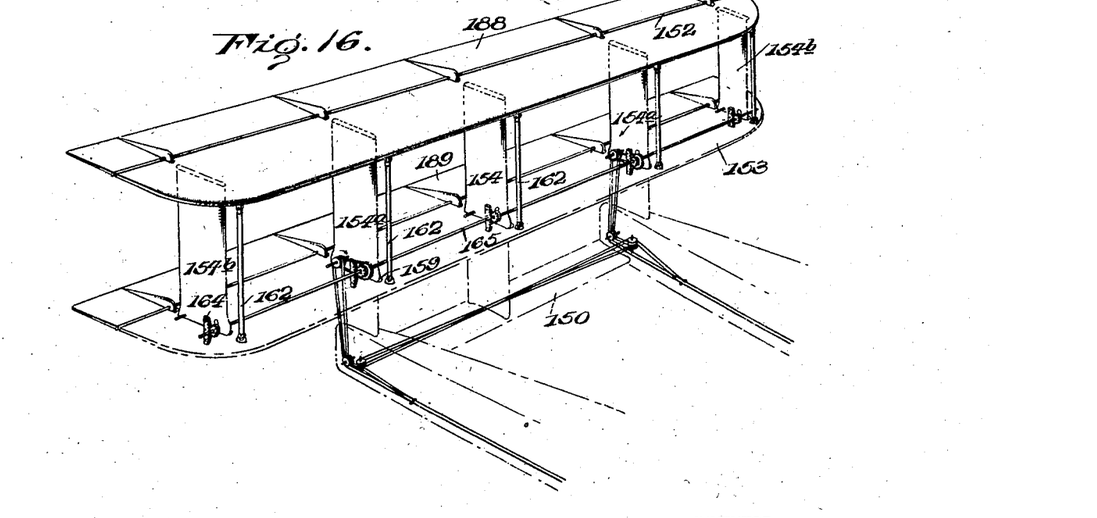
Figure 16 is a view in perspective disclosing the location and method of applying the adjustable stabilizer control at the empennage.

The series of rudder control shafts 207 have at their bottom ends, a quadrant member 208 firmly secured to the shafts so that the shafts are turned within the required angle by means of those quadrants. The quadrants being formed within the lower stabilizer and they ride through slots provided in the fore and aft members 153c of the stabilizer, as shown in Figures 10 and 11. A pair of continuous rudder control wires 209 is passed over the grooves of the series of quadrants, and secured thereto, as shown at 210. The wires referred to being divided in sections and connected by means of adjustable turnbuckles in order to regulate the tension of the same and the spaced alignment of the rudders, are passed over pulleys 211 located with the ends of the right and left hand sides of the lower stabilizer, and from thence are carried toward the center. The ends of the wire lead from the right, one of which is passed over pulley 212 and over further pulley 213 and then downwardly under pulley 214 and connected with the main rudder control cable 55 of the right hand side aircraft body 5. The other end continues toward the left passing over the left pulley 212ª and over further pulley 213ª, then downwardly over pulleys 214ª and connected with the main rudder control cable 55 of the left hand side aircraft body 5. The two ends of the wire 209 leading from the left hand side are erected in the opposite direction toward the right in a similar manner as the former ones were erected toward the left with one end passed over a second pulley 212ª and over a further second pulley 213ª, then downwardly under a second pulley 214ª and connected with the main rudder control cable 56 of the left hand side of the aircraft body 5, the other end of the wire continues toward the right and passes over a second pulley 212, 213 and 114 and is connected with the main rudder control cable 56 of the right hand side aircraft body 5. It should be understood that a pull exercised on cable 55 from either one of the aircraft bodies will pull on the right hand side ends of the rudder control wire 209 turning the rudder to the left, thereby causing the aircraft to turn to the left while a pull exercised on cable 56 of either one of the bodies will pull on the left hand side ends of the rudder wires 209 turning the rudders to the right, thereby causing the aircraft to turn to the right.

The transversal member 150 is more or less of an ordinary high camber-shaped air foil stronger than the ordinary air foil, and it is employed for bracing the tail end of the two bodies 5. It is also used as a supporting base for part of the vertical tail supporting members and brace elements of the empennage, and particularly provides housing containers for the crossing control cables of the empennage which pass through this member between the tail end of the two bodies 5. At the same time it is so set in an angle as to give an upward lift, thus assisting to carry the load of the aircraft while in flight. The member referred to does not take part as controlling element.

I claim:

1. An empennage for aircraft having a main frame-supporting structure, a horizontal bracing member carried by said supporting structure, a plurality of vertical members rigidly mounted upon said supporting structure and said bracing members, stabilizers pivotally mounted upon the vertical members, means arranged to oscillate one of said stabilizers, a plurality of links operatively connecting the stabilizers, and means for actuating the stabilizer oscillating means, whereby said stabilizers are caused to oscillate simultaneously.

2. An empennage for aircraft having a main frame-supporting structure, a horizontal bracing member carried by said supporting structure, a plurality of vertical members rigidly mounted upon said supporting structure and said bracing member, stabilizers pivotally mounted upon the vertical members, means arranged to oscillate one of said stabilizers, a plurality of links operatively connecting the stabilizers, means for actuating the stabilizers, elevators pivotally mounted to the stabilizers, and means for simultaneously actuating the elevators.

3. An empennage for aircraft having a main frame-supporting structure, a horizontal bracing member carried by said supporting structure, a plurality of vertical members rigidly mounted upon said supporting structure and said bracing member, stabilizers pivotally mounted upon the vertical members, means arranged to oscillate one of said stabilizers, a plurality of links operatively connecting the stabilizers, means for actuating the stabilizers, elevators pivotally mounted to the stabilizers, means for simultaneously actuating said elevators, rudders pivotally carried by said vertical members, and means for simultaneously operating said rudders.

4. An empennage structure for aircraft comprising a box tail assembly, said assembly comprising horizontal unbroken members, vertical unbroken supporting members, means for causing the horizontal unbroken members to oscillate relative to the vertical unbroken members, controlling means, and means for enclosing the controlling means within the structural members of the empennage.

5. An empennage structure for aircraft, comprising a box tail assembly, said assembly comprising horizontal unbroken members, vertical unbroken members, bracing elements, means for causing the horizontal unbroken members to oscillate relative to the vertical unbroken members, controlling elements, and means for enclosing the controlling elements within the structural members of the empennage, the means for causing the horizontal members to oscillate relative to the vertical members comprising a plurality of slots in the horizontal members, and the means for enclosing the controlling elements within the structural members comprising housing containers provided in the horizontal and vertical members.

6. An empennage structure for aircraft comprising a plurality of assembling means, said assembling means comprising a transversal brace member for bracing the two tail ends of the aircraft bodies, a plurality of frame structures forming vertical tail supporting members of the empennage, a plurality of vertical rudders pivoted on the vertical members, a plurality of horizontal members comprising stabilizers and elevators, bracing elements between said transversal member, the vertical members and the horizontal members forming a rigid stability between the two tail ends of the aircraft bodies, adjustable balance mechanism, means for controlling the mechanism, and means for controlling the elevators and rudders.

7. An empennage structure for aircraft, comprising in combination a plurality of frame structures rigidly supported by the tail end of the aircraft body forming the vertical supporting members of the empennage, unbroken stabilizers provided with slots to receive the frame structures, means for pivotally connecting the stabilizers along one edge to the frame structures, means for elevating or lowering the free edge of the stabilizers, whereby said stabilizers are oscillated on their pivotal connections on said frame structures, said stabilizers being provided with projections on their rear edges forming supporting bearings for receiving the elevator control shafts, a slot or recess being provided between the projections for receiving the elevator control members, and means for operating said elevators.

8. In an empennage for aircraft having stabilizers pivotally mounted, and elevators pivotally carried by the stabilizers, an operating shaft mounted for oscillation at the rear edge of one of said stabilizers, an idling shaft mounted for oscillation at the rear edge of the other stabilizer, both the operating shaft and the idling shaft having a plurality of pulleys coaxially mounted and rigidly secured to said shafts and the frame construction of the elevators, flexible connection between each corresponding upper and lower pulleys for causing both shafts to move in unison when said operating shaft is operated, flexible connection between the operating shaft and the control operating mechanism located at the pilot control operating seat, the latter flexible means being arranged to operate the latter shaft for controlling the elevators at the empennage.

9. In an empennage for aircraft having stabilizers pivotally mounted one above the other and elevators pivotally mounted to each of said stabilizers, an operating mechanism for said elevators, comprising an operating shaft and an idling shaft, the operating shaft being mounted for rocking movement at the rear edge of the lower stabilizer, the idling shaft being mounted for rocking movement at the rear edge of the upper stabilizer, projecting means provided at the rear edge of the upper and lower stabilizers for the supporting of the shafts, each of said shafts having a plurality of compression brace members coaxially mounted and rigidly formed with said shafts and the frame construction of the elevators so as to move with the shafts and be controlled by the same, the compression brace members projecting evenly on the upper and lower surfaces of the elevators with their front end conforming to the curvature of a pulley and the rear end to a cone-shaped member, extension means connecting each corresponding upper and lower member so as to cause the upper and lower shafts to move in unison whenever one of them is operated, and flexible means for controlling the operating shaft.

10. An empennage structure for aircraft, frame structures rigidly supported by the tail end of the aircraft body or bodies, stabilizers provided with slots to receive the frame structures, means for connecting the stabilizers for oscillation to one edge of the frame structures, means for elevating or lowering the free edge of the stabilizers, whereby said stabilizers are oscillated on their pivotal connections on the frame structures, said stabilizers being provided with projections at their rear edges formed with bearings, elevators pivotally mounted in the bearings, and means for operating the elevators.

11. An empennage structure for aircraft, frame structures rigidly supported by the tail end of the aircraft body or bodies, stabilizers provided with slots to receive the frame structures, means for pivotally connecting the stabilizers along one edge to the frame structures, means for elevating or lowering the free edge of the stabilizers whereby said stabilizers are oscillated on their pivotal connections on said frame structures, said stabilizers being provided with projections at their rear edges formed with bearings, elevators pivotally mounted in the bearings, and means for operating the elevators, said elevators adjacent their pivotal connection with the stabilizers being provided with pulleys rigidly connected therewith, the stabilizers being provided with recesses to receive the outer portions of the pulley.

12. An empennage structure for aircraft comprising a rigid connection for mounting the empennage on the body or bodies of the aircraft, frame structures made rigid with the connection and stabilizers pivotally mounted on the frame structures, said frame structures comprising a pair of plates having openings through the walls thereof and provided with recesses on their inner faces, means for rigidly connecting the plates together in order to form a chamber between the plates by the cooperating recesses, and means for oscillating the free edges of the stabilizers, said means being located in the chamber between the plates forming the frame structures.

13. An empennage structure for aircraft, comprising a rigid connection for mounting the empennage on the body or bodies of the aircraft, frame structures made rigid with the connection and stabilizers pivotally mounted on the frame structures, said frame structures comprising a pair of plates having openings through the walls thereof and provided with recesses on their inner faces, means for rigidly connecting the plates together in order to form a chamber between the plates by the cooperating recesses, a rack rigidly secured to an inner face of a plate, said plates being provided with arcuately shaped slots adjacent the racks, a shaft mounted in the slots and carried by the free edge of the stabilizers, a gear on the shaft adjacent each rack and in mesh with the rack whereby when the shaft is rotated said shaft, gears and free end of a stabilizer being moved upwardly or downwardly, the gears being likewise disposed within the chamber between the plates forming said frame structure.

14. An empennage structure for aircraft, frame structures rigidly supported by the tail end of the aircraft body, stabilizers provided with slots to receive the frame structures, means for pivotally connecting the stabilizers along one edge to the frame structures, means for elevating or lowering the free edge of the stabilizers whereby said stabilizers are oscillated on their hinged connections on the frame structures, said stabilizers being provided with projections at their rear edges formed with bearings, elevators pivotally mounted in the bearings, and means for operating the elevators, said frame structures being provided with elongated openings at points between the stabilizers, and rudders pivotally mounted on the frame structures and disposed within the openings.

15. An empennage for aircraft having a pair of bodies, frame structures rigidly supported by the tail end of said bodies of the aircraft, stabilizers provided with slots to receive the frame structures, means for pivotally connecting the stabilizers along one edge to the frame structures, means for elevating or lowering the stabilizers whereby said stabilizers are oscillated on their hinged connections secured to said frame structures, said stabilizers being provided with projections at their rear edges formed with bearings, elevators pivotally mounted in the bearings, and means for operating the elevators, said elevators adjacent their pivotal connections with the stabilizers being provided with rearwardly projecting horns, a link connecting the horns of the spaced-apart elevators, and means for operating one of said elevators.

16. An empennage for aircraft having a pair of bodies, frame structures rigidly supported by the tail end of said bodies of the aircraft, stabilizers provided with slots to receive the frame structures, means for pivotally connecting the stabilizers along one edge to the frame structures, means for elevating or lowering the stabilizers whereby said stabilizers are oscillated on their hinged connections carried by the frame structures, said stabilizers being provided with projections at their rear edges formed with bearings, elevators pivotally mounted in the bearings, and means for operating the elevators, said elevators adjacent their pivotal connection with the stabilizers being provided with rearwardly projecting horns, a link connecting the horns of said spaced-apart elevators, and means for operating one of the elevators, said frame structures being provided with recesses to accommodate said horns.

17. An empennage for aircraft having a pair of bodies, frame structures rigidly supported by the tail end of the bodies of the aircraft, stabilizers provided with slots to receive the frame structures, means for pivotally connecting the stabilizers along one edge to the frame structures, means for elevating or lowering the stabilizers whereby said stabilizers are oscillated on their hinged connections on said frame structures, said stabilizers being provided with projections at their rear edges formed with bearings, elevators pivotally mounted in said bearings, means for operating said elevators, said elevators adjacent their pivotal connection with the stabilizers being provided with rearwardly projecting horns, a link connecting the horns, means for operating one of the elevators, said frame structures being provided with recesses to accommodate the horns, rudders hingedly mounted on the frame structures and located between said elevators, the upper and lower ends of the rudders being sheared off at an angle whereby the elevators may be moved towards each other and forming an acute angle with each other when engaged by the adjacent free edge of the rudders.

18. An empennage for aircraft having a pair of bodies, frame structures rigidly supported by the tail end of the bodies of said aircraft, stabilizers provided with slots to receive the frame members, means for pivotally connecting the stabilizers along one edge to the frame structures, means for elevating or lowering the stabilizers whereby said stabilizers are oscillated on their hinged connections on the frame structures, said stabilizers being provided with projections at their rear edges formed with bearings, elevators pivotally mounted in the bearings, means for operating the elevators, said frame structures being provided with openings, and rudders located within the openings and pivotally connected with the frame structures, the portions of the frame structures at the periphery of the openings forming a housing for completely enclosing the rudders.

19. An empennage for aircraft having a pair of bodies, frame structures rigidly supported by the tail end of the body of the aircraft, stabilizers provided with slots to receive the frame structures, means for pivotally connecting the stabilizers along one edge to the frame structures, means for elevating or lowering the stabilizers whereby said stabilizers are oscillated on the hinged connections mounted upon said frame structures, said stabilizers being provided with projections at their rear edges formed with bearings, elevators pivotally mounted in the bearings, and means for operating the elevators, shafts vertically mounted in the frame structures, said frame structures being provided with openings adjacent the shafts, a rudder rigidly connected with each shaft, a segmental member rigidly secured to each of the shafts, cables connected to the segmental members and directed oppositely from each other so that when either of the cables are drawn the segmental member will be oscillated for rotating the shaft and for oscillating the rudders.

JOSEPH G. YONKESE.